Oct. 13, 1970 W. J. WIGHTMAN 3,533,591

TELEVISION CAMERA-CARD LEVELER

Filed May 21, 1968 2 Sheets-Sheet 1

INVENTOR
WARREN J. WIGHTMAN

BY [signature]
ATTORNEY

Oct. 13, 1970 W. J. WIGHTMAN 3,533,591

TELEVISION CAMERA-CARD LEVELER

Filed May 21, 1968 2 Sheets-Sheet 2

INVENTOR
WARREN J. WIGHTMAN

BY [signature]

ATTORNEY

United States Patent Office 3,533,591
Patented Oct. 13, 1970

3,533,591
TELEVISION CAMERA-CARD LEVELER
Warren J. Wightman, Honeoye Falls, N.Y. 14472
Filed May 21, 1968, Ser. No. 730,795
Int. Cl. A47b *97/04*
U.S. Cl. 248—452 3 Claims

ABSTRACT OF THE DISCLOSURE

Several different embodiments of a camera card leveler are shown. In one embodiment, the leveler is a ledge which has a concave upper surface on which a card can seat at its lower corners and be slid to level it. In another modification the card is supported on two longitudinally aligned wedge members which have top surfaces inclined downwardly toward one another. One wedge member is longitudinally adjustable toward the other to effect leveling of the card. In still another embodiment of the invention, the card is supported on two cams or eccentric discs rotatable on spaced parallel axes. The ledge wedge members and cams may be mounted on a backing member. A hook connected by an elastic cord to the backing member may be used to retain the card on the leveler. For better retention of the card the leveler may have a groove in its upper surface, or in the case of the cams, retaining lips.

This invention relates to card levelers, and more particularly to a leveler for information cards that are used for showing photographs, still-life pictures, and the like, on television.

It is often necessary on television, depending upon the subject matter of the show being televised, to place before the television camera a card having thereon some form of information, such as for example, a message, a photograph, art work, etc., which must be properly oriented horizontally with respect to TV cameras, so that the information on the card will be received by the television viewers in a corresponding horizontal position. When such a camera card is to be used, it may be arranged in advance of the show substantially horizontally on an easel, or the like; and during actual televising, the cameraman or director can view the image of the card in the TV camera monitor to make sure that it is properly oriented horizontally, and if not, can make the necessary adjustments. Heretofore, however, there has been no simple, satisfactory means for thus adjusting a camera card.

An object of this invention, therefore, is to provide a novel leveling device for adjustably supporting a camera card of the type described.

Another object of this invention is to provide a novel camera card leveler, which can be adjusted readily without actually touching the card.

Further objects of the invention will be apparent hereinafter from the specification and from the recital of the appended claims, particularly when read in conjunction with the accompanying drawings.

Figure 1:
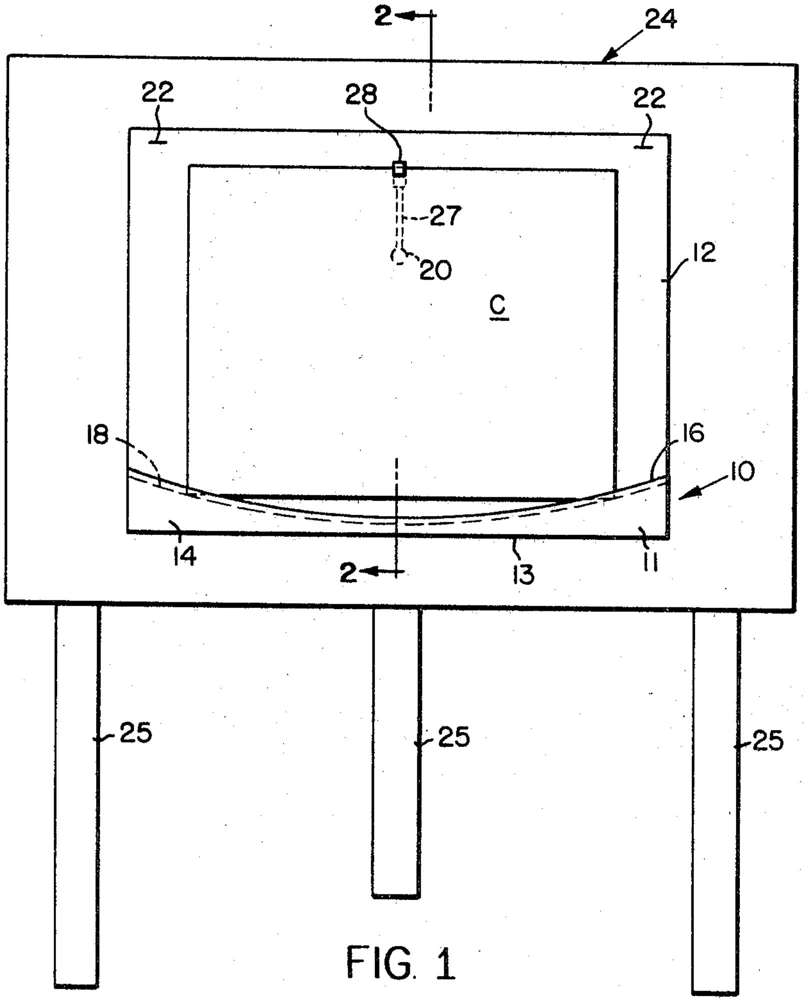
FIG. 1 is a front elevational view of a conventional easel having thereon a camera card leveler made in accordance with one embodiment of this invention.
Figure 2:
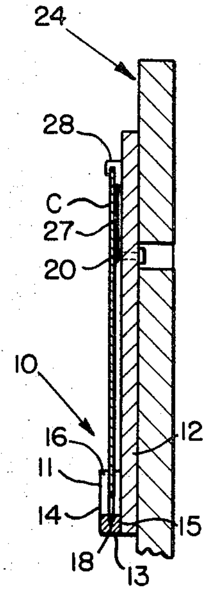
FIG. 2 is a fragmentary sectional view taken along the line 2—2 of FIG. 1 looking in the direction of the arrows.

Referring now to the drawings by numerals of reference, and first to the embodiment illustrated in FIGS. 1 and 2, 10 denotes a television camera card leveler comprising a ledge or shelf 11 and a large, flat backing member 12 secured to the ledge at the back thereof. Ledge 11 has a flat bottom 13, plane, parallel, forward and rear surfaces 14 and 15, respectively, and a concave upper surface 16, which has therein a relatively shallow, longitudinally extending groove 18. Backing member 12 extends above ledge 11 and preferably is made from cardboard, plastic, or a like material, which can be stapled, as for example at 22, or otherwise secured to the face of an easel 24, whose legs are denoted at 25.

Secured by a rivet 20 to the backing member 12 adjacent the center thereof, is a cord 27. Cord 27 carries at its free end a generally U-shaped hook 28. Cord 27 is made of a resilient material, or may be a coiled, metal tension spring.

In use, a camera card C, which has thereon some form of information, a photograph, piece of art work, or the like, is slidably seated adjacent its corners in the groove 18 of ledge 11, and hok 28 is engaged over the upper edge of the card removably and resiliently to hold the card on the leveler 10. When the backing member 12 is stapled to the easel 24, the card C may be adjusted merely by sliding it back and forth from left to right in groove 18 until the image in the TV camera monitors is horizontal. This compensates for non-level elements in the system, such as a non-level floor, easel, camera tube, or the art work itself. Even the leveler need not be stapled up level; the curved groove will compensate. It is not even necessary that the backing 12 be secured to the easel 24 so that member 11 be horizontal; slight adjustments of the card C with respect to the horizontal can be made by shifting the card on ledge 11. During such adjustment, moreover, cord 27 and hook 28 serve resiliently to secure the card C in an adjusted position.

The backing member 12, moreover, is not essential. The leveler 10 can simply be set on the shelf of an easel, or ledge 11 can be nailed or glued permanently to any backing; and leveler and backing can be placed on a table or other horizontal surface, so that the grooved upper surface 16 of the ledge can support the card. However, when the leveler 10 is used in the form shown, with a backing member 12, several such levelers with backing, can quickly be stapled or otherwise secured on a large easel or other surface to accommodate several camera cards C, as is often required in television studio operations.

The leveler may be made of any suitable material such as wood, plastic, metal, which will stand up during continued use, and will allow the corners of a card C to slide smoothly in groove 18 as the card is adjusted. Moreover, although the groove 18 is not absolutely necessary, either a groove of this type, or a flanged surface along the outer edge of surface 16 is desirable to prevent the lower edge of a card from accidentally slipping off the ledge during adjustment.

Figure 3:
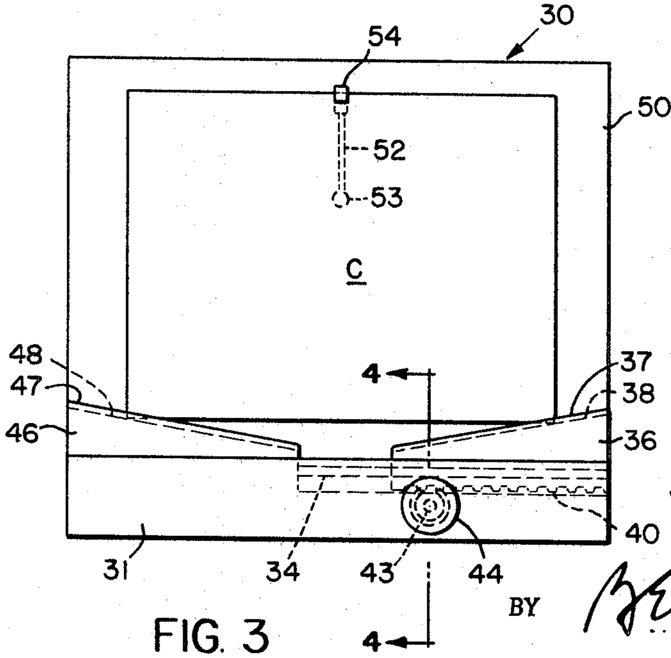
FIG. 3 is a front elevational view of a modified card leveler made in accordance with another embodiment of this invention.
Figure 4:
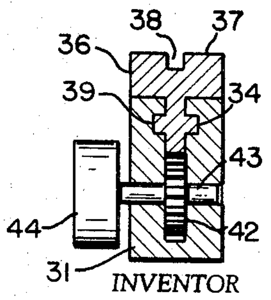
FIG. 4 is an enlarged fragmentary sectional view of this leveler taken along the line 4—4 in FIG. 3 looking in the direction of the arrows.

The modified leveler 30 illustrated in FIGS. 3 and 4 comprises an elongate, generally rectangular card-supporting member 31 having in its upper surface adjacent one end thereof a longitudinally extending slot or groove 34, which is cross-shaped in cross section, and extends from the right end of member 31 to approximately the midpoint of the length of this member.

Mounted for sliding adjustment on the upper surface of member 31 is a slidable wedge 36 having an inclined upper surface 37, which has therein a longitudinally extending groove 38. Projecting from the underside of wedge 36 is an integral, longitudinally extending, cross-shaped guide portion 39, which is slidable in groove 34 in member 31. Along its bottom guide 39 has formed thereon a rack 40, the teeth of which mesh with a pinion 42, which is secured to a shaft 43 that is journaled in member 31 to rotate about an axis that extends at right angles to the direction in which wedge 36 is adjustable. A knurled knob 44 is secured to the outer end of shaft 43 for manually adjusting wedge 36 selectively to the right or to the left from its position illustrated in FIG. 3.

Secured on the upper surface of member 31 in opposed relation to slidable wedge 36, to cooperate therewith, is a fixed wedge 46, which also has in its inclined, upper surface 47 a longitudinally extending slot 48. Both the upper surfaces 37 and 47 of the wedges are inclined downwardly and inwardly toward the midpoint of member 31 as shown more clearly in FIG. 3.

As in the first embodiment, the card supporting member 31 is preferably secured to the lower edge of a large, rectangular backing member 50, similar to the card 12. Also as in the first embodiment, an elastic cord 52 may be secured by a rivet 53 to backing member 50, to carry a hook 54 for resiliently holding a camera card C (FIG. 3) on the wedges 36 and 46 with the lower corners of the card seated in the grooves 38 and 48. Card C can be adjusted with respect to the horizontal by rotating knob 43 to shift the wedge 36 selectively, as required to the right or left.

While the wedges 36 and 46 have been shown as having upper grooved surfaces, obviously these surfaces could be flat.

Figure 5:
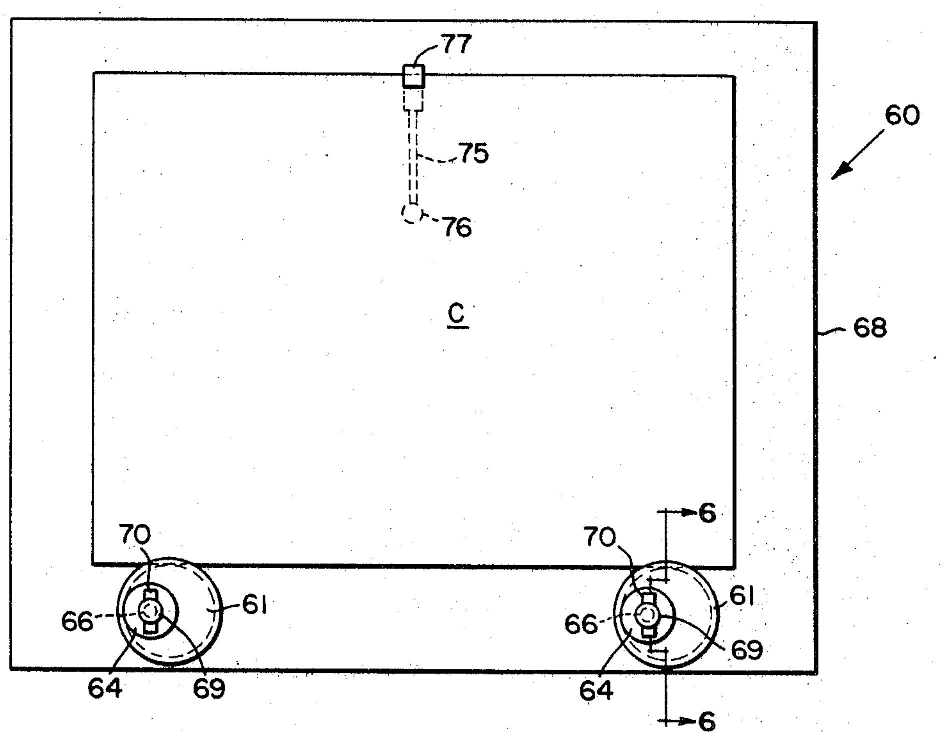
FIG. 5 is a front elevational view of a card leveler made in accordance with a still further embodiment of this invention.
Figure 6:
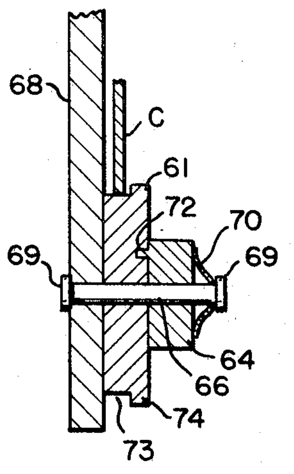
FIG. 6 is an enlarged fragmentary sectional view of this leveler taken along the line 6—6 in FIG. 5 looking in the direction of the arrows.

The leveler 60 illustrated in FIGS. 5 and 6 comprises a pair of disc-shaped cams or eccentrics 61, which together with a pair of actuating knobs 64, are mounted to rotate about spaced, parallel shafts 66, which project from the face of a backing member 68 adjacent the lower corners thereof. At opposite ends each shaft 66 has enlarged heads 69, one of which engages the rear surface of backing member 68, and the other of which overlies a Belleville spring 70, which engages the associated knob 64 resiliently to urge it and the adjacent cam 61 against the face of member 68. Each knob 64 may have an integral teat 72, which projects into a cooperating recess in the associated cam 61, so that when a knob 64 is rotated about its shaft 66, it will also rotate the adjacent cam 61.

To help support the lower edge of a card C on the peripheries 73 of the cams 61, each cam has a radially outwardly projecting retaining flange or lip 74 (FIG. 6), which projects above the lower edge of the card C, when the latter edge is seated on the peripheries 73 of the cams. Also, as in the prior embodiments, an elastic cord 75 may be secured by a rivet 76 to the backing member 68, and carry a hook 77, which is adapted to be hooked over the upper edge of the card C as shown in FIG. 5 to help retain the card on the cams. Each cam 61 has its periphery 73 offset from the axis of rotation of the cam. Therefore, by rotating one of the knobs 64, the adjacent end of the card C may be raised or lowered depending upon in which direction the cam is turned, to level the card.

The knobs 64 can be eliminated, if desired; and the cams may then be rotatably adjusted simply by grasping their flanges or lips 74.

From the foregoing it will be apparent that applicant has developed a relatively simple, inexpensive leveler for rapidly and easily adjusting television camera cards with respect to the horizontal.

Moreover, while the invention has been described in connection with a card leveler for TV camera work, it will be understood that it may be used, also, as a work leveler for copy cameras and the like.

While the invention has been described then in connection with several specific embodiments thereof and in particular therefor, it will be understood that it is capable of even further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

Having thus described my invention, what I claim is:

1. A camera card leveler comprising means for supporting a card at two longitudinally spaced points only along the lower edge of the card and on which the card may be slidably adjusted longitudinally, said supporting means comprising two longitudinally spaced wedge members, each of which has its upper surface inclined downwardly toward the other, one of said wedge members being adjustable longitudinally toward the other.

2. A camera card leveler comprising a large backing member having a flat face, and means on said member defining at least a pair of laterally spaced supporting surfaces, which project outwardly from the face of said member adjacent the lower edge thereof for engagement by the lower edge of a camera card to support the latter in front of said member, each of said supporting surfaces being adapted to have substantially point contact with the lower edge of the card supported thereon, and being disposed at an angle to the horizontal so that movement of either one of said supporting surfaces and said card, respectively, in a lateral direction will effect adjustment of the lower edge of the card with respect to the horizontal, said means comprising an elongate support secured to the face of said backing member adjacent the lower edge thereof, and a pair of spaced wedges mounted on said support, one of which is adjustable toward and away from the other, said wedges having their upper surfaces inclined to the horizontal in a longitudinal direction, and disposed in intersecting planes, thereby to form said spaced supporting surfaces.

3. A camera card leveler as defined in claim 2, wherein said one wedge has an integral guide portion slidable in a slot in said support to guide said one wedge for movement longitudinally of said support, and said mounting means includes a rack on said guide portion, and a pinion meshing with said rack and mounted on said support to be rotatable manually by a knob at the front of said support.

References Cited

UNITED STATES PATENTS

| | | | |
|---|---|---|---|
| 224,232 | 2/1880 | Schrader | 114—192 |
| 2,772,485 | 12/1956 | Gelb | 33—184.5 |

FOREIGN PATENTS

| | | |
|---|---|---|
| 3,953 | 12/1872 | Great Britain. |
| 411,708 | 5/1945 | Italy. |
| 522,160 | 3/1921 | France. |

ROY D. FRAZIER, Primary Examiner

F. DOMOTOR, Assistant Examiner

U.S. Cl. X.R.

248—473